United States Patent

Iihoshi et al.

Patent Number: 5,170,165
Date of Patent: Dec. 8, 1992

[54] APPARATUS FOR DISPLAYING TRAVEL PATH

[75] Inventors: Akira Iihoshi; Yukinobu Nakamura; Yoshiyuki Matsumoto; Tomoyuki Nishio, all of Saitama, Japan

[73] Assignee: Honda Giken Kogyo Kabushiki Kaisha, Tokyo, Japan

[21] Appl. No.: 514,304

[22] Filed: Apr. 26, 1990

Related U.S. Application Data

[63] Continuation of Ser. No. 224,985, Jul. 27, 1988, Pat. No. 4,963,864.

[30] Foreign Application Priority Data

Aug. 7, 1987 [JP] Japan ............................ 62-198630
Aug. 7, 1987 [JP] Japan ............................ 62-198631
Aug. 7, 1987 [JP] Japan ............................ 62-198632
Aug. 7, 1987 [JP] Japan ............................ 62-198633
Aug. 7, 1987 [JP] Japan ............................ 62-198634

[51] Int. Cl.[5] .......................................... G08G 1/123
[52] U.S. Cl. ............................ 340/995; 73/178 R; 364/449
[58] Field of Search ............ 340/995, 990, 988; 73/178 R; 364/449, 444, 460

[56] References Cited

U.S. PATENT DOCUMENTS

| 4,535,335 | 8/1985 | Tagami et al. | 340/988 |
| 4,679,147 | 7/1987 | Tsujii et al. | 340/995 |
| 4,688,176 | 8/1987 | Hirata | 73/178 R |
| 4,774,671 | 9/1988 | Itoh et al. | 340/995 |
| 4,774,672 | 9/1988 | Tsunoda et al. | 340/995 |
| 4,792,907 | 12/1988 | Ikeda et al. | 340/995 |
| 4,963,864 | 10/1990 | Iihoshi et al. | 340/995 |
| 5,016,007 | 5/1991 | Iihoshi et al. | 340/995 |

FOREIGN PATENT DOCUMENTS

61-243318 4/1985 Japan.

Primary Examiner—Jin F. Ng
Assistant Examiner—Brent A. Swarthout
Attorney, Agent, or Firm—Lyon & Lyon

[57] ABSTRACT

Disclosed is a travel path displaying apparatus for indicating the current position of an automobile running on a selected road in a road map appearing on an associated screen. A cumulation of errors in estimating sequential current positions will cause an incorrect indication of the automobile's position on the screen and the automobile will depart from all the roads appearing on the screen. In order to find the correct road on which the automobile is traveling it is necessary to carry out pattern matching between the travel trace and each of a number of selected roads, thereby determining which road is closest to the travel trace in shape. The apparatus permits selection of the least possible number of roads for pattern matching, thus permitting quick determination as to the road on which the automobile is traveling and as to the direction in which it is traveling.

2 Claims, 6 Drawing Sheets

APPARATUS FOR DISPLAYING TRAVEL PATH

This is a continuation of co-pending application Ser. No. 224,985 filed on Jul. 27, 1988, and now U.S. Pat. No. 4,963,864.

BACKGROUND OF THE INVENTION

The present invention relates to an apparatus for displaying a travel path in which the current position of a moving body such as an automobile is given on a road map appearing on a screen.

In an attempt to prevent a driver from losing his way when travelling in an unfamiliar place, an apparatus for displaying a travel path has been proposed in which the current position of the driver's automobile is sequentially estimated in terms of X- and Y- coordinates by carrying out algorithmic operations on the automobile's running distance and direction of travel. The automobile's running distance and direction of travel are determined by an associated distance meter and direction sensor, respectively. The current position of the driver's automobile then appears in the form of a dot on a road map appearing on a screen.

A cumulation of errors in determining the running distance and direction of the automobile will result in an incorrect indication of the automobile's current position. In some instances, an incorrect current position will cause the display dot to depart from all roads appearing on the driver's screen such that the driver will be unable to determine the road on which his car is running.

Past attempts to solve this problem have proposed comparing a travel trace having sequentially renewed estimated current car positions thereon with all the roads in the vicinity of the last estimated current car position on the screen to find the roads having similar patterns. This is accomplished according to the conventional pattern matching process. The road which is closest in shape to the travel trace is then selected as the "true" road on which the car is running. The dot image of the last estimated current car position is then put on what appears to be the true road.

This correction, however, will require much time if many roads and branch roads appear in the vicinity of the last estimated current car position because a pattern matching must be carried out for each of these selected roads.

SUMMARY OF THE INVENTION

With the above in mind one object of the present invention is to provide an apparatus for displaying a travel path which permits only the necessary pattern matching of a limited number of roads to provide a more efficient and accurate means for locating the current position of a car within a minimum possible time.

According to the present invention, only the necessary pattern matching is effected and only on a least number of roads selected for identification. To attain this objective an apparatus for displaying a travel path according to the present invention comprises; a first processing means for setting, each time the moving body runs a predetermined running distance in the displayed road map, an estimated current position of the moving body on the road or roads or branch roads on which the moving body is supposed to run, with reference to the previously stored X- and Y- coordinates of the road or roads on the road map; a second processing means for making, each time the moving body runs said predetermined running distance, a decision as to whether or not a given correlation is established between a selected presumed current position and the last estimated position of the moving body and, in the affirmative case, selecting a road having the presumed current position thereon; a third processing means for carrying out a pattern-matching between the travel trace pattern running to the last estimated current position and the so selected road pattern; and a fourth processing means for putting the travel course of the moving body in registration with the selected road on the road map.

In order to find the exact current car position with this arrangement, it is necessary to employ a pattern-matching procedure to reduce any offset of the estimated current car position from the road on which the car is supposed to run. Pattern-matching is effected by setting a presumed current car position, on a road or its road branches on which the car is supposed to run; deciding whether or not a predetermined relationship representing the possible erroneous locating range, is established between the estimated current car position and the presumed current car position, and in the affirmative case, selecting the road or road branches having the presumed current car position thereon as the true road; and effecting a pattern matching between the travel trace having sequential estimated current car positions thereon and each of the so selected road or road branches. Thus, the least number of roads or road branches are selected for pattern-matching. Accordingly the time involved for pattern-matching can be reduced to a minimum.

According to one aspect of the present invention only the necessary pattern-matching is effected between the travel trace, which was drawn while the directional increments were being integrated, and a selected road on the road map each time the cumulation of directional increments reaches a fixed amount. A decision is then made as to whether or not the selected road is the one on which the car is running. This improves the efficiency with which only the necessary pattern-matching is effected to find the correct current car position.

According to another aspect of the present invention, a travel trace having sequentially estimated positions thereon and a selected road on the road map are given in the form of a broken line composed of straight increments of equal length. The necessary pattern-matching is then effected by comparing each subsequent increment of the selected road approximation with corresponding increments of the travel trace approximation in terms of position and direction. This facilitates matching work and improves the accuracy with which pattern-matching is effected.

According to still another aspect of the present invention, a travel trace having sequentially estimated positions thereon and a selected road on the road map are given in the form of a broken line composed of straight increments of equal length. The necessary pattern-matching is then effected by placing the travel trace approximation in a position parallel with the selected road approximation and then determining the correlation between each subsequent increment of the selected road approximation and corresponding increments of the travel trace approximation. This aspect of the invention also facilitates the matching work and improves the accuracy with which the pattern-matching is effected.

According to still another aspect of the present invention, in the event that no presumed current position can be found within a first distance range from the last estimated car position, the pattern-matching is effected by setting a tentatively presumed current position on the road or roads running within a second longer distance range; setting sequentially tentatively presumed current positions on the same road or roads until a tentatively presumed current position on such road or one of such roads falls within the first distance range from the last estimated position; and then regarding the tentatively presumed current position on such road or one of such roads as the presumed current position, thereby permitting necessary patten-matching to continue without interruption even if the estimated car positions are far from the roads indicated on the road map.

BRIEF DESCRIPTION OF THE DRAWINGS

Other objects and advantages of the present invention will be apparent from the following description of preferred embodiments of the present invention which are shown in the accompanying drawings.

DETAILED DESCRIPTION OF THE PREFERRED EMBODIMENT

Figure 1:
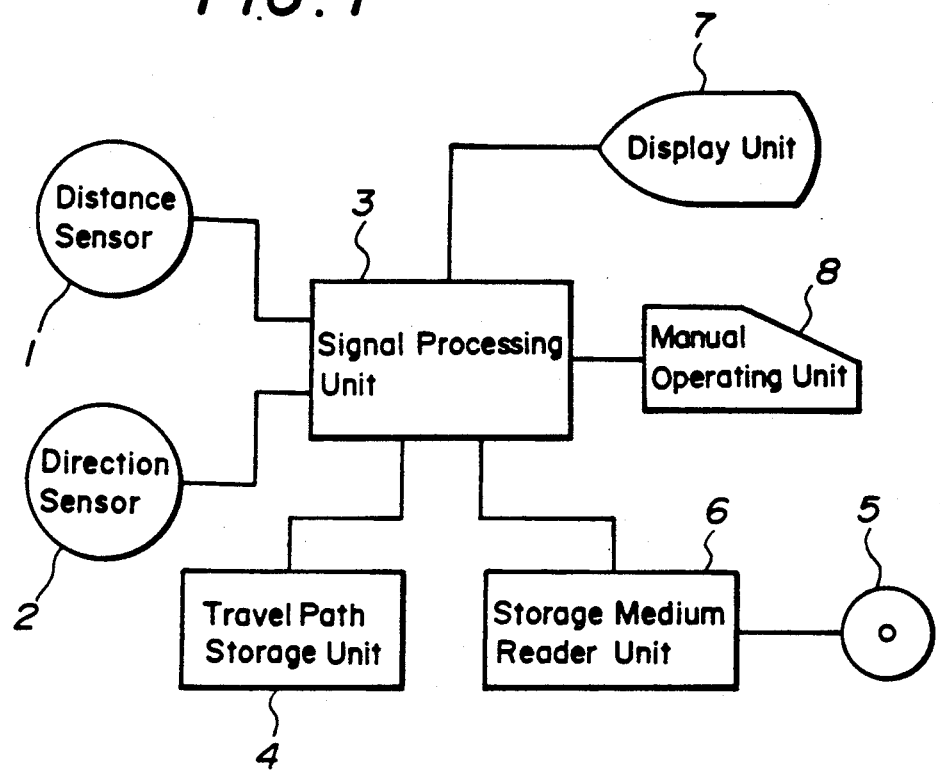
FIG. 1 is a block diagram schematically illustrating an apparatus for displaying a travel path according to the present invention.

Referring to FIG. 1, a schematic illustration of an apparatus for displaying a travel path according to the present invention is shown. It comprises an opto-electrical, electromagnetic or mechanical-contact type distance sensor 1 which is responsive for instance, to the rotation of the wheels of a car and generates a pulse signal each time the car runs a unit distance; a direction sensor 2 such as a gyroscope which is capable of detecting any variation in angular speed in the yaw direction; a signal processing unit 3 which is composed of a central processing unit for controlling the entire system, ROMs for storing programs and RAMs for storing controlling data, wherein the signal processing unit is capable of counting the pulses from the distance sensor 1 to determine the running distance of the car, determining the direction in which the car is running on the basis of the signals from the direction sensor 2, and conducting a cumulative algorithmic operation of vectors to determine the current car position in terms of X- and Y-coordinates for each unital running distance; a travel trace storing unit (RAM) 4 for sequentially storing the X- and Y-coordinates of current car positions; a road map storage medium 5 for storing different road maps in a file; a storage medium reader unit 6 for selectively reading different road maps in a file; a display unit 7 for presenting a selected road map and the travel trace in terms of sequential current car positions and directions on an associated screen; a manual operating unit 8 for sending operation commands including commands for selecting a desired road map from the file, setting a starting position at a given point on the selected road map, turning the selected road map or turning the travel trace on the selected map, shifting selected dots representing car positions on the road map, enlarging or reducing selected areas in the road map at a desired rate and performing other required operations.

Figure 2:
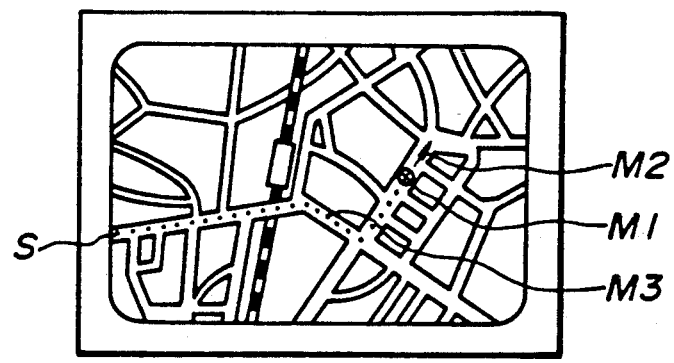
FIG. 2 illustrates a road map image and a series of dots representing sequential current car positions appearing on the screen of the travel path displaying apparatus.
Figure 3:
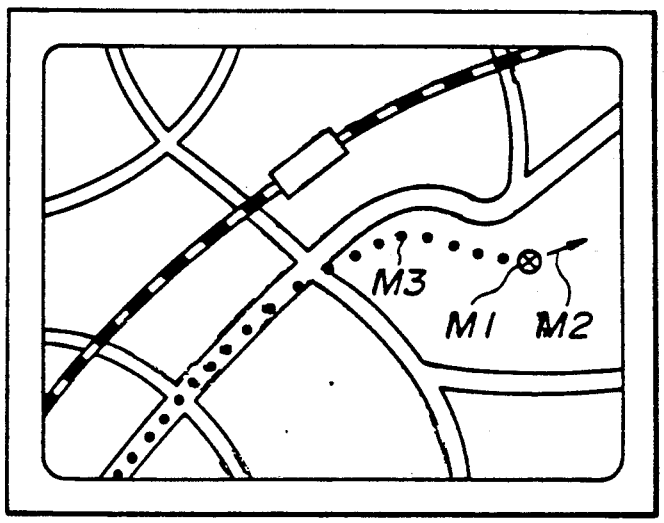
FIG. 3 illustrates a similar road map image having sequential current car positions showing the departure of a travel course from the road on the road map.

In operation a selected road map appears on the screen of the display unit 7, and current car positions are given sequentially in dots on a selected road on the screen to indicate a travel trace which the car has already run while the signal processing unit 3 is carrying out the necessary algorithmic operations to renew the X- and Y- coordinates of current car position in the travel trace storing unit (RAM) 4. Thus, as illustrated in FIG. 2, the screen of the display unit 7 shows the last estimated current car position M1, the direction M2 in which the car is about to run from the last estimated current car position, and sequential car positions M3 plotted one after another from the starting position S.

The arrangement and operation described so far are the same as the conventional travel path displaying apparatus described above.

In the conventional travel path displaying apparatus, positioning errors are apt to cumulate as the car runs a relatively long distance. Accordingly, the travel trace will continue to deviate increasing distances from the selected road on the road map until the car can no longer be located on the road map on the screen.

Such travel path displaying apparatus is improved according to the present invention in that the travel trace having sequential and last estimated current car positions thereon, is corrected and put in registration with the true road by selecting the road or roads in the vicinity of the last estimated current car position and conducting the pattern-matching procedure between the travel trace and each of the so selected roads. Specifically, the number of selected roads with respect to which the travel trace is to be checked for similarity is reduced to a minimum, but is still adequate to permit the selection of the true road and exact location of the car on the road map. Thus, the burden of pattern-matching in the central processing unit is reduced to a minimum.

Figure 4A:
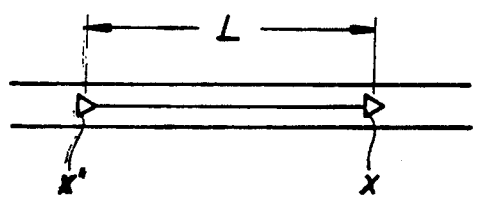
FIGS. 4(a) and 4(b) illustrate how presumed current car positions are put on a road and road branches for each increment of running distance, respectively.
Figure 4B:
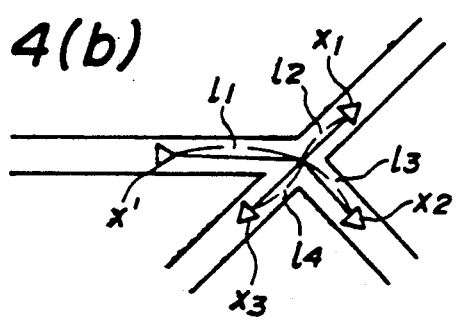

Referring to FIG. 4(a), if the car is running on a straight road having no branches within a predetermined distance L from the last presumed current car position x', the subsequently presumed current car position x is set the predetermined distance L ahead of the last presumed current car position x' on the same road. Referring to FIG. 4(b), if the car is running on a straight road having branches within the predetermined distance L from the last presumed current car position x', the subsequently presumed current car positions x1, x2, and x3 are set the predetermined distance L ahead of the last presumed current car position x' on all the branches (l1+l2=l1+l3=l1+l4=L).

Each time the distance measuring unit 1 detects that the car ran a given constant distance L, the signal processor 3 carries out the necessary algorithmic operation with reference to the coordinates of the position of the selected road appearing on the screen of the display unit 7 to automatically put presumed current car positions on the road. Presumed current car positions may be sequentially renewed at a predetermined time rather than at a predetermined distance.

Also, the interval between subsequent settings of presumed current car positions may be varied depending on the traffic condition of the road. The X- and Y-coordinates of each road are stored in the road map memory medium 5.

Next, a decision is made as to whether or not the distance between each of the presumed current car positions and the last estimated current car position which deviates from all the roads, is within a given allowance. If the road or roads are within such allowance then the presumed current car positions within such allowance are selected and will be subjected to pattern-matching.

Figure 5:
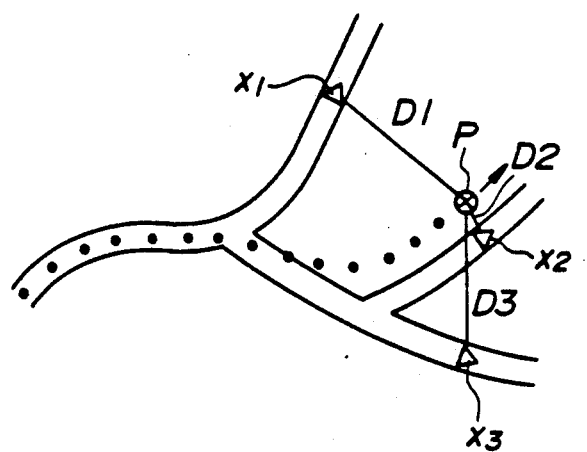
FIG. 5 illustrates how the last estimated car position is related to corresponding presumed current car positions on selected roads on the road map.

Referring to FIG. 5, the distances between presumed current car positions x (x1, x2 and x3) and the estimated current car position P are indicated at D (D1, D2 and D3).

Presumed current car positions which meet the following equation (1), are selected.

$$D \leq aL = M \quad (1)$$

where "M" stands for a predetermined allowance, for instance 50 meters, "a" stands for a coefficient pertaining to the accuracy with which the car is located with reference to the running distance as a parameter, for instance 5%, and "L" is set, for instance, at 100 meters.

Alternatively, presumed current car positions which are found on the roads existing within a predetermined angular allowance when measured with respect to the direction in which the car is about to move from the last estimated current car position, may be selected to determine which roads are nominated for pattern-matching.

For a relatively small value of "M" only the presumed current car position x2 may be selected, and then the road on which the presumed current car position x2 is found, will be "nominated" for pattern matching.

Thus, if there are many roads in the vicinity of the last estimated current car position, a least number of most probable true roads will be selected for pattern matching, thereby minimizing the burden of the pattern matching process.

In the travel path displaying apparatus of the present invention the car's direction of motion is constantly monitored. Each time the integration of angular variations increases above a predetermined amount, the travel trace is presumed to change in shape and a necessary pattern matching is carried out. Accordingly, this will substantially reduce the burden of pattern matching, compared with that which would be required if a pattern matching were carried out each time a presumed current car position is set after running a predetermined distance.

Figure 6:
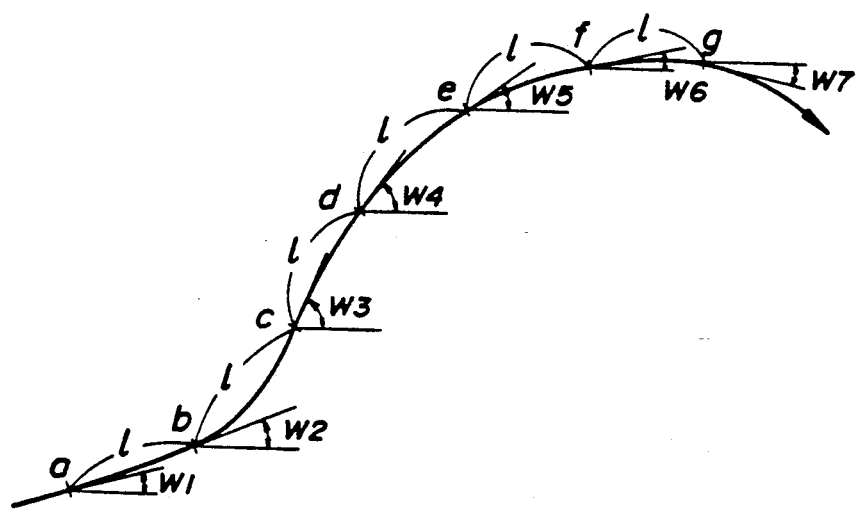
FIG. 6 illustrates how subsequent increments in a travel path change in direction.

Specifically, as illustrated in FIG. 6, an angular variation wi (i=1, 2, 3, ...) is determined at points a, b, c, d, ..., a predetermined distance apart from each other, and the cumulation W of these angular variations is calculated from the following equation:

$$W = \sum_{i=1}^{n} |Wi + 1 - Wi| (i = 1, 2, 3, \ldots) \quad (2)$$

When the angular cumulation W increases above a predetermined value, the travel trace running from the starting point "a" (at which the last pattern matching was carried out) to the last estimated current car position is selected and "nominated" for pattern-matching.

Figure 7:
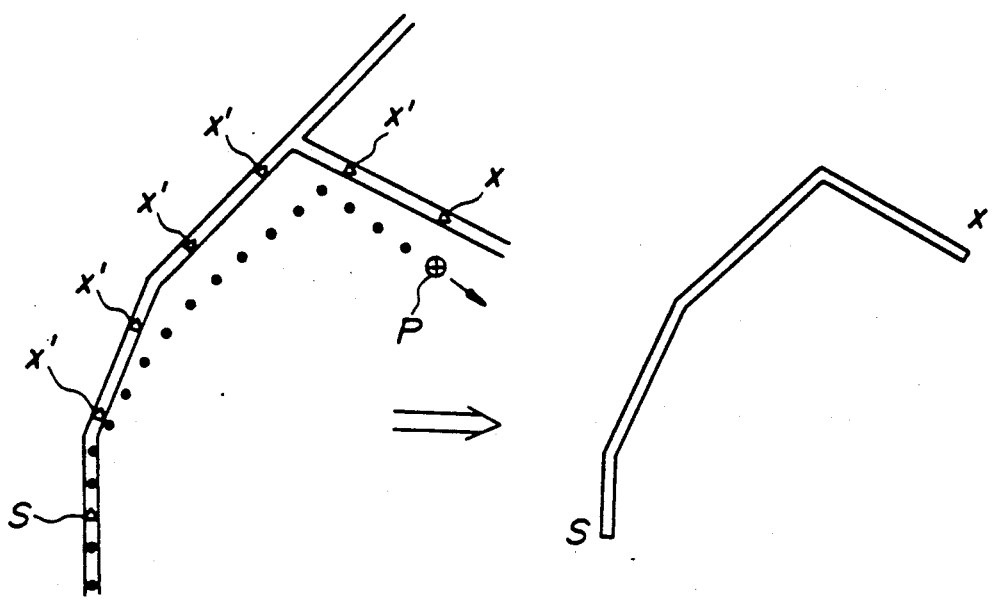
FIG. 7 illustrates how a road pattern which is to be "nominated" for pattern-matching is formed.
Figure 8A:
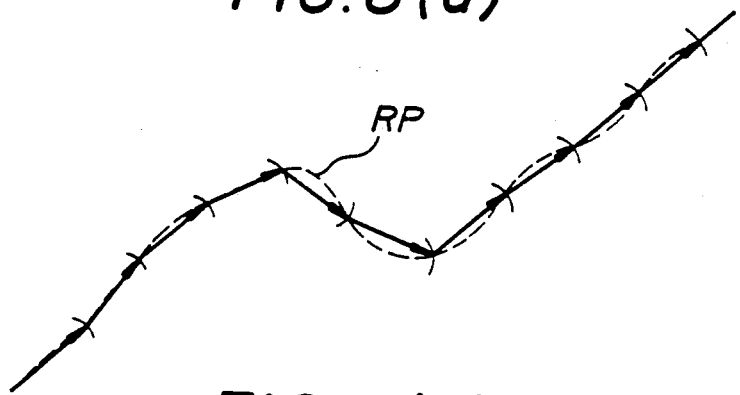
FIGS. 8(a) and 8(b) illustrate, respectively, travel trace and selected road approximations which are given in broken lines and composed of straight increments of equal length.
Figure 8B:
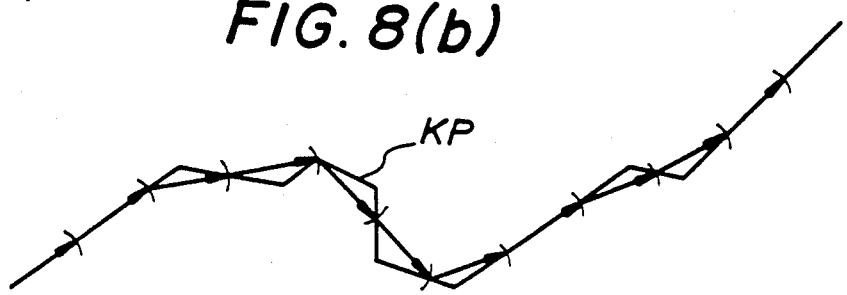
Figure 9:
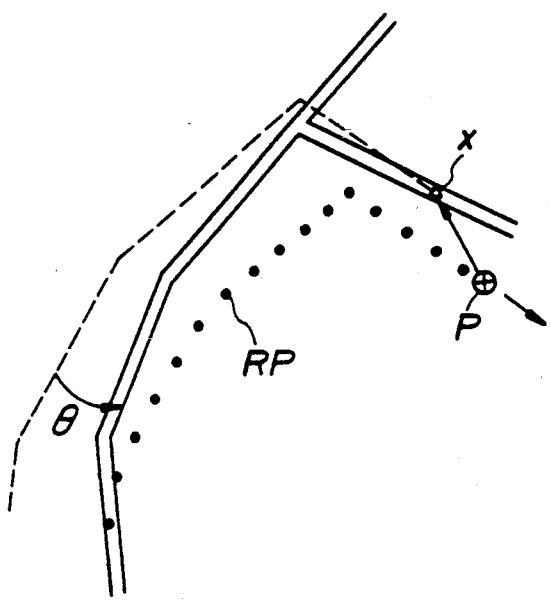
FIG. 9 illustrates how the travel trace and the last estimated car position are put in registration with a selected road which identifies with the travel path.

Thus, a travel trace having a noticeable change in shape is selected for pattern-matching. Therefore, the accuracy with which the pattern matching is carried out will be substantially improved. In addition, the frequency with which it is necessary to employ pattern-matching will be substantially reduced. As illustrated in FIG. 7, a road pattern to be "nominated" for pattern-matching is the one having presumed current car positions x' thereon with the presumed current position x corresponding to the last estimated current car position P at its head and with the point S at which the last pattern-matching was carried out at its tail.

In forming a road pattern having presumed current car positions thereon for the purpose of carrying out pattern-matching efficiently, it is necessary to increase the value of M in the equation (1) at a given fixed rate with the increase of the travelling distance of the car. This is necessary because the distance between an estimated current car position and a corresponding presumed car position will increase with the increase of the travelling distance of the car.

Also, in carrying out the necessary pattern-matching between a trace pattern RP and a "nominated" road pattern KP, the signal processing unit 3 converts these patterns into approximations of broken lines of equal length. The pattern-matching is then carried out between each of subsequent vectors in the travel trace and road pattern approximations. This divisional pattern-matching can be carried out easily and accurately by comparing corresponding direction and position vectors of the travel trace and road patterns.

Specifically, a positional correlation is determined between the trace pattern and the road pattern by first, rotating the trace pattern until it is put in parallel relation with the road pattern, and then, summing up the distances between individual vectors of the trace and road pattern approximations as follows:

First, the rotating angle θ of a series of vectors (s1, s2, s3 ..., sn) of the trace pattern with respect to a series of vectors (r1, r2, r3 ..., rn) of the road pattern is determined by:

$$\theta = \sum_{i=1}^{n} w(i) \cdot \cos^{-1}(si \cdot ri/|si| \cdot |ri|) \times 1/\sum_{i=1}^{n} w(i) \quad (3)$$

where w(i) is a weight function, and $$|s1| = |s2| = |s3| = \ldots |sn| = |r1| = |r2| = \ldots = |r1|.$$

Second, the series of trace vectors is rotated by θ by using the following equation:

$$si' = \begin{pmatrix} \cos\theta & -\sin\theta \\ \sin\theta & \cos\theta \end{pmatrix} si \qquad (4)$$

The rotation of the trace vectors causes a reduction of directional errors, if any.

Third, the value "f" of the positional correlation between the trace and road vector series is determined by:

$$f = \sum_{i=1}^{n} \left| \sum_{j=1}^{i} sj - \sum_{j=1}^{i} rj \right| \qquad (5)$$

A distance error may be caused when estimating the current car position P. Therefore, taking such distance error into consideration, the positional correlation values f are determined with respect to extended and shortened road patterns. These can be formed by extending and shortening the nominated road pattern from its top position x by $\delta$ (several times ten meter).

Finally, the smallest value is selected among these correlation values f. If the smallest value thus selected is found to be below a given reference value, then these patterns are mated. That is, the trace pattern RP is, first, translated such that the last current car position P is placed on the top position of the road pattern (for instance, at the $x+\delta$ position) and, second, rotated by $\theta$ so that it may be put in registration with the road pattern.

The pattern-matching process thus described permits positional correction of a car if its estimated position has departed from every road appearing on the road map.

The extended or shortened distance from the last estimated current position x on the nominated road is divided into a plurality of segments. Thereafter, the plurality of road patterns having extended or shortened sections at their top positions are formed. Then, the correlation value f is determined between each road pattern and the trace pattern. When the smallest correlation value f is found to be below a reference value, a decision is made to effect the pattern-matching. This process improves the accuracy with which pattern-matching is effected.

Figure 10:
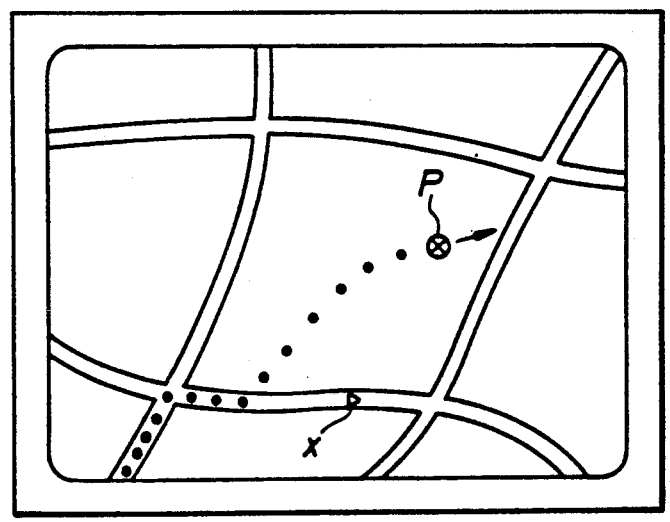
FIG. 10 illustrates a road map image showing that a car is erroneously running off course.

In selectively nominating a road for pattern-matching with reference to the last estimated current car position x as described earlier: if the car deviates from all roads on the road map as shown in FIG. 10, and if the estimated current car position P is too far from the roads to apply Equation 1 in determining which road the corresponding presumed current position x is to be put, then no road can be nominated for pattern-matching, and pattern-matching will be impossible.

In an attempt to carry out necessary pattern-matchings without intermission, even if the car deviates too far from all the roads to determine which road a presumed current car position is to be put on, a search is made for a road or roads running across the circle which has a predetermined radius (for instance, 100 meters) from the last estimated current car position. If such road or roads are found, a tentatively presumed current car position or positions are set on the road or roads at the point or points which are closest to the last estimated current car position. The tentatively presumed current car position or positions are renewed each time the car runs a predetermined distance until they come too close to the last estimated current car position to permit application of Equation 1. Then, the last tentatively presumed current car position or positions are regarded as equivalent to the real presumed current car position or positions. Thus, necessary pattern-matching can be effected. In practice, the image of the travel trace is not given on the screen while the car is deviating from all the roads on the road map. After the presumed current car position is set on the selected road, the necessary pattern-matchings are carried out between the selected road pattern and the travel trace pattern.

A decision as to whether or not there is a road within a fixed distance range from the last estimated current car position may be made without intermission. Otherwise, such decision may be made at intervals measured, for instance, at every occurrence of a timing pulse or each time the car runs a predetermined distance (for instance, 100 meters).

Figure 11A:
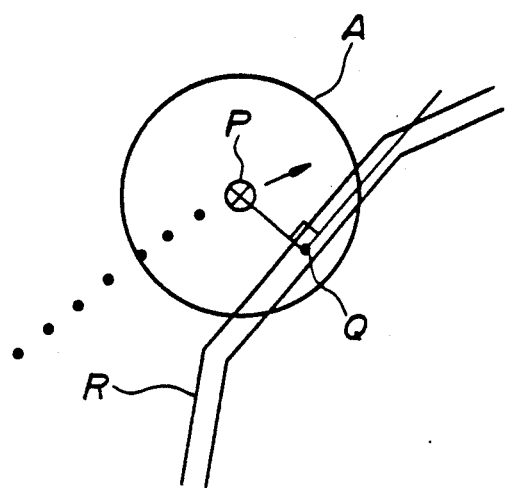
FIGS. 11(b) and 11(c) illustrate how presumed current car positions are tentatively put on selected roads which run across a circle having the last estimated current car position as its center.

FIG. 11(a) shows that there is a road R running across the circle A which has its center on the last estimated current car position P. In this case, a tentatively presumed current car position is put on the point Q where the road R and a line from the last estimated current car position P1 extending perpendicular to the road R cross each other.

Figure 11B:
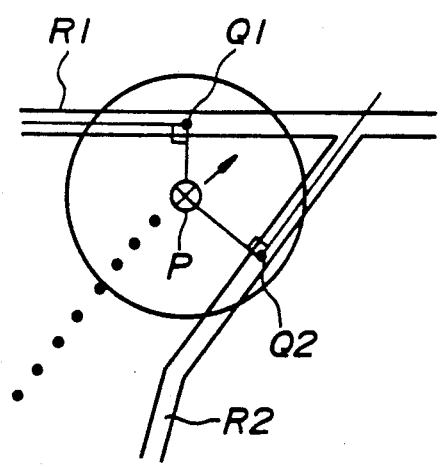

FIG. 11(b) shows that there are two roads R1 and R2 running across the circle A which has its center on the last estimated current car position P. In this case, tentatively presumed current car positions are put on the point Q1 and Q2 at which the roads R1 and R2 and lines extending from the last estimated current car position P perpendicular to the roads R1 and R2 cross each other.

Figure 11C:
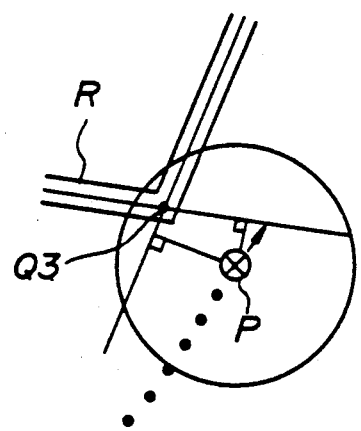

FIG. 11(c) shows that there is a road R running across the circle A which has its center on the last estimated current car position P, but does not permit a line to be drawn perpendicular to the road R. In this case, a tentatively presumed current car position is put on the curve Q3 of the road which is closest to the last estimated car position P.

In order to reduce the time involved for locating a road within the circle despite the increasing erroneous estimation of current car position P, the radius of the circle A may be varied proportionally to the running distance after no presumed current car position "x" can be determined with reference to Equation 1.

As is apparent from the above, if the car position on the screen deviates from the road on which the car is supposed to run as a result of the cumulation of errors in estimating the current car position, the estimated car position is corrected by carrying out a pattern-matching between the road pattern and the trace pattern ending with the last estimated current car position. Then, the presumed current car position or positions are put on the road on which the car is supposed to run or on the branch roads extending from the road. A decision as to whether or not a certain relation represents the possible erroneous locating range is made between the last estimated current car position and each presumed current car position. Then, the presumed current car position or positions which were found to satisfy the relation, are selected. Next a pattern-matching is carried out between the travel trace pattern and each road pattern having the so selected presumed current car position thereon and finally, the last estimated current car position is shifted to be in registration with the presumed current car position on the road pattern, thus completing the correction of the last estimated current car position. According to this invention the least possible number of roads can be selected for pattern-matching allowing the necessary pattern-matchings to be carried out efficiently. Similarly, correction of the current car position can be performed both quickly and accurately.

What is claimed is:

1. An apparatus for displaying the travel path of a moving body wherein the current position of the moving body is cumulatively calculated and sequentially renewed on a road map displaying road patterns on a screen by arithmetically processing estimated current positions of the moving body in terms of X- and Y-coordinates while measuring the moving body's running distance and detecting its direction of travel and sequentially storing the X- and Y-coordinates of the estimated current positions, the running distance and the direction of travel in a memory, characterized in that it comprises:

first processing means for automatically setting a presumed current position corresponding to an estimated current position on the road map each time the moving body runs a predetermined running distance, the presumed current position being set at a predetermined distance interval on each road on which the moving body is supposed to run, with reference to X- and Y- coordinates of the road patterns, the X- and Y- coordinates of the road patterns being previously stored in memory;

second processing means for determining, each time the moving body runs the predetermined running distance, whether the distance between the presumed current position and a last estimated current position of the moving body exists within a predetermined distance range and, when such determination is in the affirmative, selecting a road pattern having the presumed current position thereon as a selected road pattern;

third processing means for arithmetically processing a pattern-matching of the selected road pattern and a travel trace extending from the last estimated current position retrieved from the memory; and fourth processing means for correcting the travel trace of the moving body so that it coincides with the selected road pattern to which the pattern-matching between the travel trace and the selected road pattern of the moving body has been effected; and wherein the pattern matching is effected between the travel trace of the moving body and the selected road pattern on the road map on the display screen which are each approximated by a series of broken lines comprised of straight line segments of equal length, by (1) rotating the travel trace to place it in parallel relation with the selected road pattern on the road map on the display screen by algorithmic operation using the travel trace data, (2) calculating the distances between each corresponding line segments of the travel trace pattern and the selected road pattern, (3) calculating a summation of the distances between the travel trace and the selected road pattern, and (4) when the summation is found to be below a predetermined value, matching the travel trace with the selected road pattern.

2. An apparatus for displaying the travel path of a moving body wherein the current position of the moving body is cumulatively calculated and sequentially renewed on a road map displaying road patterns on a screen by arithmetically processing estimated current positions of the moving body in terms of X- and Y-coordinates while measuring the moving body's running distance and detecting its direction of travel and sequentially storing the X- and Y-coordinates of the estimated current positions, the running distance and the direction of travel in a memory, characterized in that it comprises:

first processing means for automatically setting a presumed current position corresponding to an estimated current position on the road map each time the moving body runs a predetermined running distance, the presumed current position being set at a predetermined distance interval on each road on which the moving body is supposed to run, with reference to X- and Y- coordinates of the road patterns, the X- and Y- coordinates of the road patterns being previously stored in a memory;

second processing means for determining, each time the moving body runs the predetermined running distance, whether an angle between a vector extending in the direction in which the moving body travels as it leaves the last estimated current position on the moving body and a vector extending in the direction in which the road extends from the selected presumably current position on the road is within a predetermined angle range and, when such determination is in the affirmative, selecting a road pattern having the presumed current position thereon as a selected road pattern;

third processing means for arithmetically processing a pattern-matching of the selected road pattern and a travel trace extending from the last estimated current position retrieved from the memory; and fourth processing means for correcting the travel trace of the moving body so that it coincides with the road pattern to which the pattern-matching between the travel trace and the selected road pattern of the moving body has been effected; and wherein pattern matching is effected between the travel trace of the moving body and the selected road pattern on the road map on the display screen which are each approximated by a series of broken lines comprising straight line segments of equal length, by (1) rotating the travel trace to place it in parallel relation with the selected road pattern on the road map on the display screen by algorithmic operation using the travel trace data, (2) calculating the distance between each corresponding line segments of the travel trace and the selected road pattern, (3) calculating a summation of the distances between the travel trace and the selected road pattern, and (4) when the summation is found to be below a predetermined value, matching the travel trace with the selected road pattern.

* * * * *